(12) United States Patent
Henry et al.

(10) Patent No.: US 10,856,181 B2
(45) Date of Patent: Dec. 1, 2020

(54) TRAFFIC STEERING BETWEEN DIFFERENT WIRELESS NETWORKS

(71) Applicant: Cisco Technology, Inc., San Jose, CA (US)

(72) Inventors: Jerome Henry, Pittsboro, NC (US); Robert Edgar Barton, Richmond (CA); Indermeet Singh Gandhi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 16/130,904

(22) Filed: Sep. 13, 2018

(65) Prior Publication Data
US 2020/0092752 A1   Mar. 19, 2020

(51) Int. Cl.
*H04W 28/10* (2009.01)
*H04W 28/02* (2009.01)
*H04L 12/24* (2006.01)
*H04L 12/801* (2013.01)
*H04W 84/12* (2009.01)

(52) U.S. Cl.
CPC .......... *H04W 28/10* (2013.01); *H04L 41/0893* (2013.01); *H04L 47/14* (2013.01); *H04W 28/0284* (2013.01); *H04W 84/12* (2013.01)

(58) Field of Classification Search
None
See application file for complete search history.

(56) References Cited

U.S. PATENT DOCUMENTS

| 9,674,853 | B2 * | 6/2017 | Faccin | H04W 28/085 |
| 9,763,159 | B2 | 9/2017 | Sang et al. | |
| 10,110,635 | B1 * | 10/2018 | Hussain | H04L 63/205 |
| 2010/0071024 | A1 * | 3/2010 | Eyada | H04L 63/0263 726/1 |

(Continued)

OTHER PUBLICATIONS

M. Amani et al., "Programmable Policies for Data Offloading in LTE Network", King's College London, London, UK and F5 Networks, San Jose, CA, pp. 1-6, Sep. 5, 2018.

(Continued)

*Primary Examiner* — Edan Orgad
*Assistant Examiner* — Emmanuel K Maglo
(74) *Attorney, Agent, or Firm* — Patterson + Sheridan, LLP (57) ABSTRACT

A method comprising obtaining, from a first wireless network characterized by a first radio access technology (RAT), a first set of wireless network policies. The first set of wireless network policies characterizes a first wireless channel provided to a client device by the first wireless network. The method includes obtaining, from a second wireless network characterized by a second RAT different from the first RAT, a second set of wireless network policies. The second set of wireless network policies characterizes a second wireless channel provided to the client device by the second wireless network. The method includes generating a set of aggregated policies by aggregating the first and second sets of wireless network policies based on one or more aggregation criteria. The method includes providing the set of aggregated policies. The set of aggregated policies directs the client device to steer traffic to the first and second wireless networks.

20 Claims, 6 Drawing Sheets

(56) References Cited

U.S. PATENT DOCUMENTS

| | | | |
|---|---|---|---|
| 2010/0075704 A1* | 3/2010 | McHenry | H04W 16/14 |
| | | | 455/509 |
| 2010/0080224 A1* | 4/2010 | Panwar | H04L 45/745 |
| | | | 370/392 |
| 2012/0324100 A1* | 12/2012 | Tomici | H04L 45/123 |
| | | | 709/224 |
| 2013/0242965 A1 | 9/2013 | Horn et al. | |
| 2014/0130119 A1* | 5/2014 | Goldschlag | H04L 63/20 |
| | | | 726/1 |
| 2014/0165134 A1* | 6/2014 | Goldschlag | H04W 12/0806 |
| | | | 726/1 |
| 2014/0247807 A1* | 9/2014 | Westerberg | H04W 36/34 |
| | | | 370/331 |
| 2014/0315536 A1* | 10/2014 | Chow | H04W 8/18 |
| | | | 455/419 |
| 2014/0341076 A1* | 11/2014 | Orlandi | H04W 48/18 |
| | | | 370/254 |
| 2015/0131483 A1* | 5/2015 | Colban | H04W 48/16 |
| | | | 370/254 |
| 2016/0219588 A1* | 7/2016 | Buddhikot | H04M 15/68 |
| 2016/0278139 A1* | 9/2016 | Lei | H04W 28/08 |
| 2017/0126494 A1* | 5/2017 | Chan | H04L 41/0806 |
| 2017/0251401 A1 | 8/2017 | Comstock | |

OTHER PUBLICATIONS

S. Zhenge et al., "SDN-Based Data Offloading 5G Mobile Networks", ZTE Communications, pp. 1-72, Jun. 25, 2014.

* cited by examiner

TRAFFIC STEERING BETWEEN DIFFERENT WIRELESS NETWORKS

TECHNICAL FIELD

The present disclosure relates generally to wireless networking, and in particular, steering traffic between different wireless networks.

BACKGROUND

In a number of places, two or more different wireless networks provide service coverage for the same physical area. Each wireless network is characterized by a particular radio access technology (RAT). Examples of RATs are cellular networks defined by the Third Generation Partnership Project (3GPP) and 802.11 based wireless local area networks (WLANs).

BRIEF DESCRIPTIONS OF THE DRAWINGS

For a better understanding of aspects of the various implementations described herein and to show more clearly how they may be carried into effect, reference is made, by way of example only, to the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative implementations shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the implementations described herein.

Overview

Various implementations disclosed herein include apparatuses, systems, devices, and methods to enable steering traffic between different wireless networks. The method comprises obtaining, from a first wireless network characterized by a first radio access technology (RAT), a first set of wireless network policies. The first set of wireless network policies characterizes a first wireless channel provided to a client device by the first wireless network. The method further includes obtaining, from a second wireless network characterized by a second radio access technology (RAT) different from the first RAT, a second set of wireless network policies. The second set of wireless network policies characterizes a second wireless channel provided to the client device by the second wireless network. The method further includes generating a set of aggregated policies by aggregating the first and second sets of wireless network policies based on one or more aggregation criteria. The method further includes providing, to the client device, the set of aggregated policies. The set of aggregated policies directs the client device to steer traffic to the first and second wireless networks.

In accordance with some implementations, a traffic-steering device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a traffic-steering device, cause the traffic-steering device to perform or cause performance of any of the methods described herein. In accordance with some implementations, a networking includes: one or more processors, a non-transitory memory, and means for performing or causing performance of any of the methods described herein.

Example Embodiments

Increasingly, a given client device, such as a smartphone, is likely to include multiple radios for communicating with multiple wireless networks. Having multiple radios enables the client device to send and receive traffic over multiple wireless links. Consequently, the client device may steer traffic from one wireless network link to another wireless network link in order to exploit more favorable conditions at the other wireless network link. In certain deployments, the client device steers traffic between wireless networks characterized by different RATs. For example, as a smartphone moves away from a coffee-shop WLAN, the smartphone steers traffic from the coffee-shop WLAN to a cellular network (e.g., 4G, LTE, 5G) when the received signal strength indication (RSSI) associated with the coffee-shop WLAN falls below a certain level.

However, previously available systems do not provide a client device pertinent information about the various available wireless networks that would enable the client device to make more beneficial traffic steering decisions. This ignorance constrains the current deployments to simple and crude traffic-steering mechanisms. Moreover, in certain current systems, the multiple links between the client device and the respective wireless networks are configured and deployed independently of each other. In other words, these systems lack a central controller with knowledge of the multiple networks associated with the multiple links. Accordingly, these systems cannot account for policies associated with each other network. As a result, these systems implement simple and crude mechanisms for traffic-steering. For example, one system simply tells the client device to default to a WLAN link when it is available.

These current systems exhibit at least the following problems. First, a particular application may be better suited running on one RAT versus another RAT, but current systems does not have application-based steering. For example, a cellular network link may be congested, and so it would be advantageous for the client device to route traffic associated with a critical application (e.g., voice) to another link, such as a WLAN link. Second, a local policy may outright block the client device from receiving certain types of traffic, such as online video game traffic while the client device is on a workplace WLAN. Current systems, however, do not have a mechanism for providing this information to the client device so as to enable the client device to route this kind of traffic to another link (e.g., cellular link). Moreover, although certain current systems, such as quick UDP Internet connections (QUIC) and multipath TCP (MPTCP), provide simplistic load-balancing components, they do not account for complex wireless network policies. Accordingly, having a deeper and wider understanding of wireless network policies would enable the client device to make more valuable traffic-steering decisions.

To that end, various implementations disclosed herein account for respective policies of the multiple wireless networks. These policies include network and channel conditions, as well as application-specific policies, providing the client device with a wider and deeper understanding of the networks to which it is connected. Accordingly, the client device is able to make more valuable traffic-steering decisions, thereby increasing the performance at the client device (e.g., higher bandwidth, lower latency, etc.).

Figure 1:
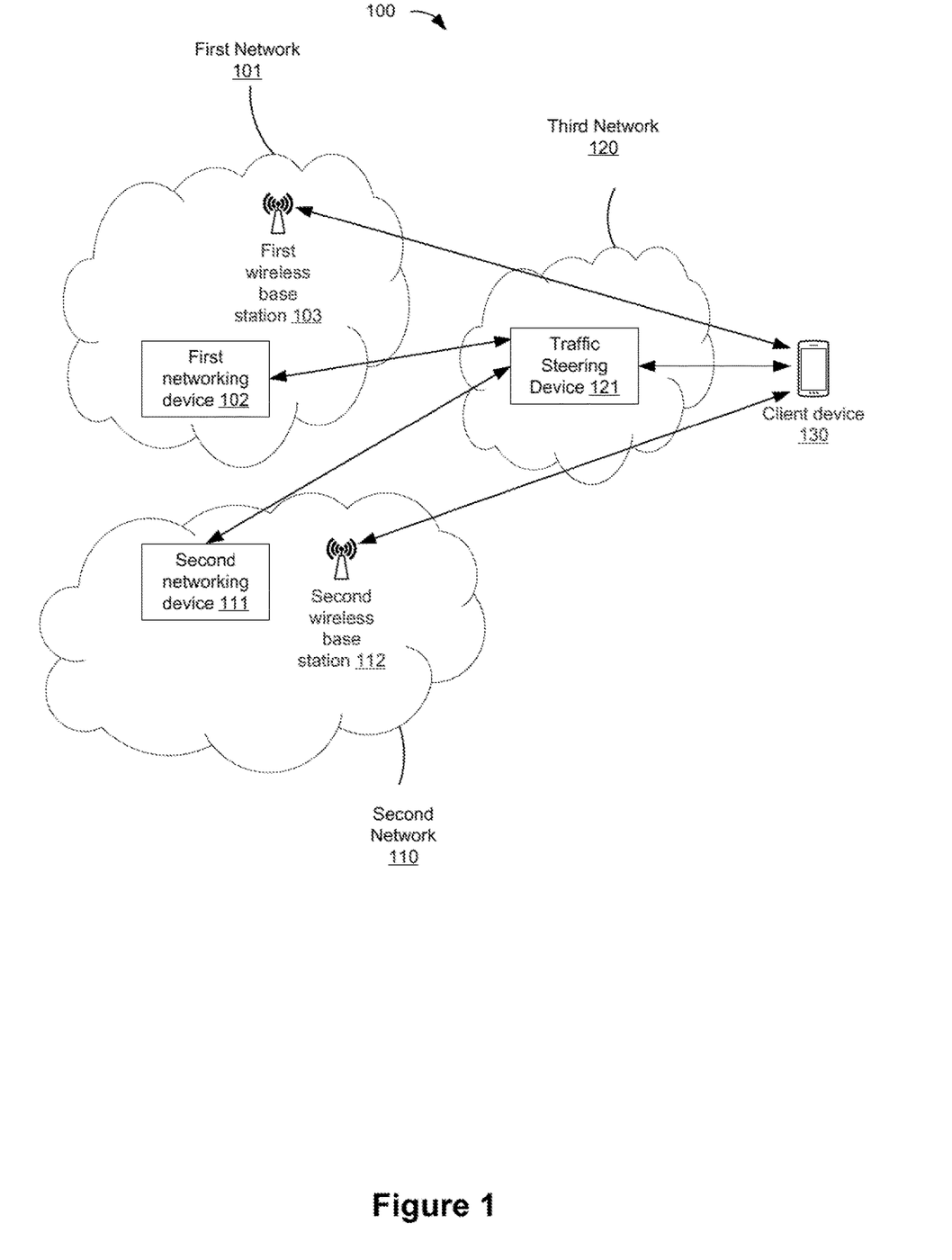
FIG. 1 is a block diagram of an example of a wireless networking environment with traffic steering in accordance with some implementations.

FIG. 1 is a block diagram of an example of a wireless networking environment with traffic steering 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the first example of the networking environment 100 includes a first network 101, a second network 110, and a third network 120.

The first network 101 is characterized by a first radio access technology (RAT). In some implementations, the first network 101 corresponds to a 3GPP-defined cellular network, such as a 5G network. In some implementations, the first network 101 is managed by a mobile network operator (MNO). The MNO provides wireless services to client devices, such as the client device 130 illustrated in FIG. 1. Although only one client device 130 is illustrated in FIG. 1, one of ordinary skill in the art will appreciate that any number of client devices may exist in the networking environment 100. In some implementations, the client device 130 corresponds to a user equipment (UE), such as a smartphone, laptop, tablet, IoT sensor, autonomous vehicle device, AR/VR device, etc.

In various implementations, the first network 101 includes a first wireless base station 103 that provides the client device 130 connectivity to the first network 101. In various implementations, the first wireless base station 103 provides wireless network access to one or more client devices 130 (e.g., UEs) within a corresponding coverage area. In other words, the first wireless base station 103 corresponds to one of a variety of wireless access points for client devices, such as cellular base stations or unlicensed-band access points (e.g., Wi-Fi access points). Particular functionality of the first wireless base station 103 may be implemented in accordance to specific standards, and the first wireless base station 103 may in turn be referred to by other names particular to specific standards. For example, in some LTE-based implementations, the first wireless base station 103 corresponds to an eNodeB (providing coverage to a client device within a cellular network), or a home eNodeB (HeNodeB) providing a femtocell coverage area within a building. As another example, in some 5G-based implementations, the first wireless base station 103 corresponds to a gNodeB, having similar functionality to an eNodeB.

In various implementations, the first network 101 includes a first networking device 102 (e.g., controller, router, switch, server). In some implementations, the first networking device 102 is coupled to the first wireless base station 103. In some implementations, the first networking device 102 is a component at (e.g., co-located with) the first wireless base station 103. As will be further described below, in some implementations, the first networking device 102 provides a first set of wireless network policies to a traffic-steering device 121.

The second network 110 is characterized by a second RAT that is different from the first RAT. In some implementations, the second network 110 corresponds to an IEEE 802-based network, such as a wireless LAN (WLAN) (e.g., Wi-Fi, Wi-Max).

In various implementations, the second network 110 includes a second wireless base station 112 that provides the client device 130 with connectivity to the second network 110. In some implementations, the second wireless base station 112 corresponds to an access point (AP).

In various implementations, the second network 110 includes a second networking device 111 (e.g., controller, router, switch, server). In some implementations, the second networking device 111 is coupled to the second wireless base station 112. In some implementations, the second networking device 111 is a component at (e.g., co-located with) the second wireless base station 112. In some implementations, the second networking device 111 is at a WLAN controller (WLC) that manages one or more access points. In some implementations, the second networking device 111 is not in communication with the first networking device 102. As will be further described below, in some implementations, the second networking device 111 provides a first set of wireless network policies to the traffic-steering device 121.

The third network 120 corresponds to any type of network operable to communicate with both the first network 101 and the second network 110. For example, in some implementations, the third network 120 corresponds to a wide-area network (WAN), such as the Internet or the Cloud. As another example, in some implementations, the third network 120 corresponds to an IEEE 802-based network, such as Wi-Fi. For example. In yet another example, in some implementations, the third network 120 corresponds to a cellular network, such as a 5G cellular network. In yet another, in some implementations, the third network 120 corresponds to a combination of a cellular 5G network and a non-cellular 5G, including an exclusively non-cellular 5G network.

The third network 120 includes a traffic-steering device 121. In general, the traffic-steering device 121 is a networking device with knowledge of the first network 101 and the second network 110, such as a network controller. For example, in some implementations, the traffic-steering device 121 or components thereof are at an intent-based network management (e.g., automation and assurance) system, such as Cisco's digital network architecture (DNA) center.

As will be further described below, the traffic-steering device 121 provides pertinent information in order to facilitate traffic steering by the client device 130. Namely, the traffic-steering device 121 obtains a first set of wireless network policies from the first network 101 and a second set of wireless network policies from the second network 110.

In some implementations, at least one of the first set of wireless network policies or the second set of wireless network policies include corresponding first condition-information about the first wireless channel and second condition-information about the second wireless channel. For example, the wireless network policies include the latency of a channel. In some implementations, at least one of the first set of wireless network policies or the second set of wireless network policies include corresponding first condition-information about the first wireless network and second condition-information about the second wireless network. For example, the wireless network policies include the resource utilization level of a network.

In some implementations, the first set of wireless network policies includes a first application-specific policy associated with a particular application, and the second set of wireless network policies includes a second application-specific policy associated with the particular application. In some implementations, each of the first application-specific policy and the second application-specific policy includes corresponding performance threshold values associated with the particular application. In some implementations, each of the first application-specific policy and the second application-specific policy includes a corresponding priority policy associated with the particular application.

Additionally, the traffic-steering device 121 generates a set of aggregated policies by aggregating the first and second policy vectors based on one or more aggregation criteria. In some implementations, the one or more aggregation criteria include one or more user class criteria or one or more security criteria.

Moreover, the traffic-steering device 121 provides the set of aggregated policies to the client device 130. In some implementations, the traffic-steering device 121 provides the set of aggregated policies to the client device 130 according to the 802.11u protocol. In some implementations, the traffic-steering device 121 provides the set of aggregated policies, via a generic advertisement service (GAS) vendor specific information element, in response to obtaining, from the client device 130, a GAS request for the set of aggregated policies.

Figure 2:
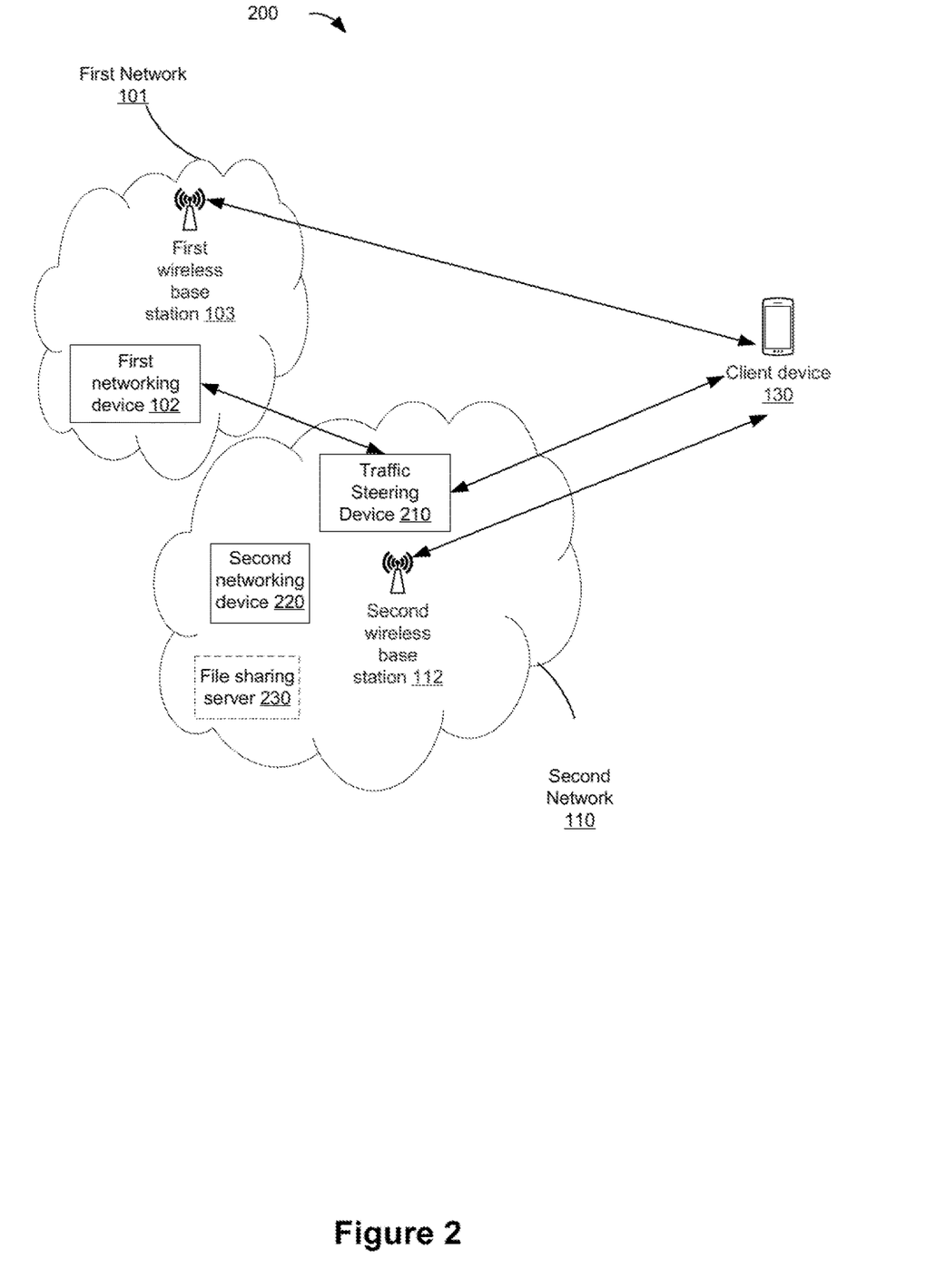
FIG. 2 is a block diagram of an example of a wireless networking environment with traffic steering in accordance with some implementations.

FIG. 2 is a block diagram of an example of a wireless networking environment 200 with traffic steering in accordance with some implementations. In various implementations, the traffic-steering device 210 in FIG. 2 is similar to and adapted from the traffic-steering device 121 in FIG. 1. Notably, in contrast to the traffic-steering device 121 in FIG. 1, the traffic-steering device 210 in FIG. 2 resides in the second network 110. For example, in some implementations, the traffic-steering device 210 resides at the second wireless base station 112, such as an access point in a WLAN. As another example, in some implementations, the traffic-steering device 210 resides at a WLAN controller (WLC) that manages the second wireless base station 112. Because the traffic-steering device 210 resides in the second network 110, the second networking device 220 may quickly and efficiently push local network policies to the traffic-steering device 210. For example, the second network 110 may correspond to a school WLAN, and the networking device 220 pushes a no profanity content policy to the traffic-steering device 210 via a local switch.

In some implementations, the second networking device 220 corresponds to an authentication system. For example, in some implementations, the second networking device 220 corresponds to a Remote Authentication Dial-In User Service (RADIUS) server. The RADIUS server enables one or more file sharing servers 230, such as network access server (NAS) devices, to share a common authentication, authorization, and accounting database. As one example, in response to the client device 130 attempting to associate with the second network 110, the file sharing server 230 sends an access request and a request for wireless network policies to the second networking device 220, a RADIUS server. Consequently, the second networking device 220 provides validated credential of the client device 130, as well as the second set of wireless network policies.

Figure 3:
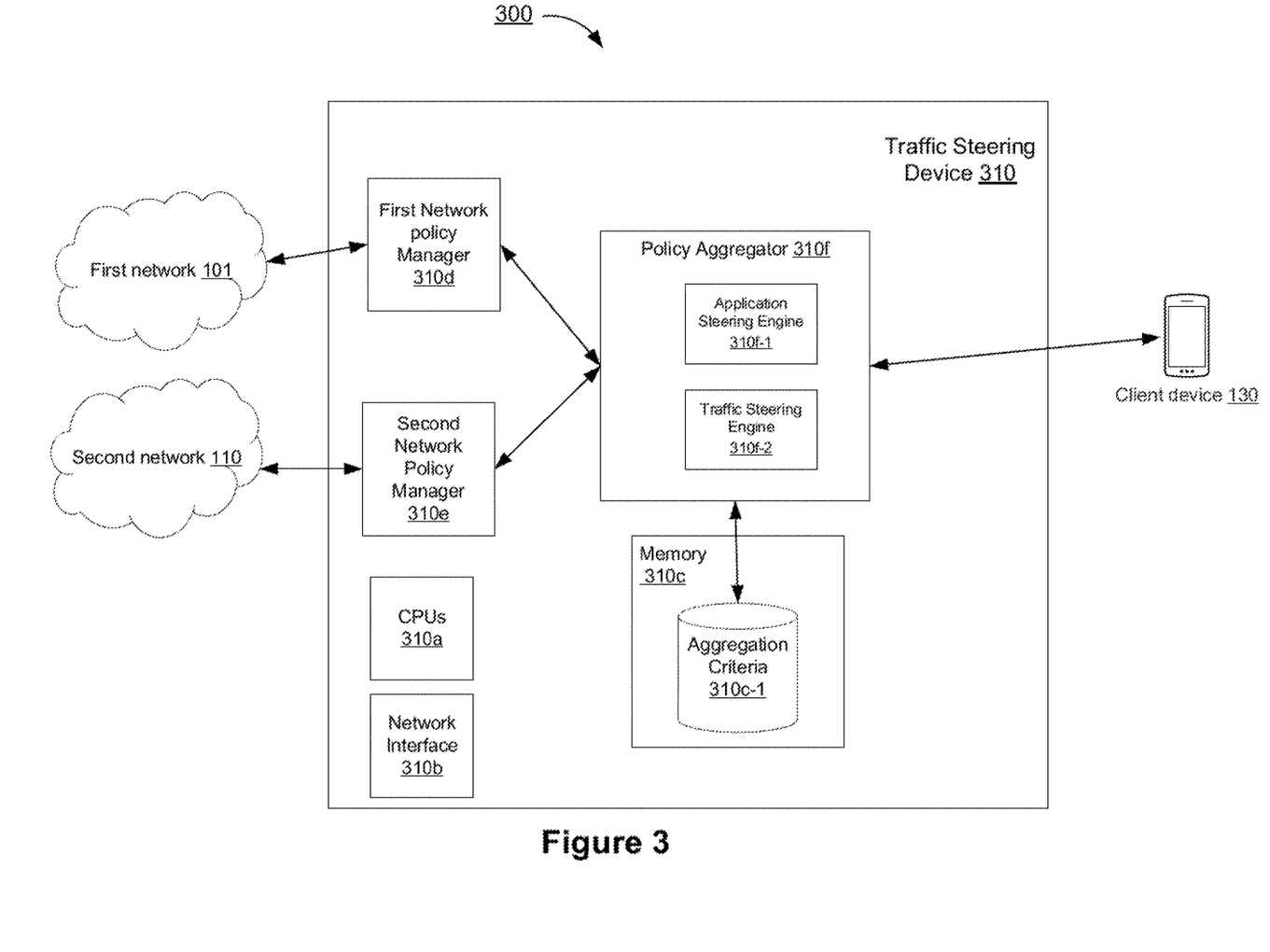
FIG. 3 is a block diagram of a traffic-steering device in a wireless networking environment in accordance with some implementations.

FIG. 3 is a block diagram of a traffic-steering device in a wireless networking environment 300 in accordance with some implementations. In various implementations, the traffic-steering device 310 in FIG. 3 is similar to and adapted from the traffic-steering device 121 in FIG. 1 and/or the traffic-steering device 210 in FIG. 2.

The traffic-steering device 310 includes one or more CPUs 310a. In various implementations, the one or more CPUs 310a provide processing resources for facilitating traffic steering, including: obtaining wireless network policies; aggregating the wireless network policies; aggregating the wireless network policies according to one or more aggregation criteria 310c-1; and providing the aggregated wireless network policies to the client device 130.

The traffic-steering device 310 further includes a network interface 310b that provides an input/output interface for obtaining wireless network policies and providing an aggregated version of the wireless network policies to the client device 130.

The traffic-steering device 310 further includes a memory 310c. In various implementations, the memory 310c corresponds to a non-transitory memory, such as RAM, ROM, etc. The memory 310c includes the one or more aggregation criteria 310c-1. In various implementations, the memory 310c stores the wireless network policies obtained from the first wireless network 101 and the second wireless network 110.

The traffic-steering device 310 further includes a first network policy manager 310d and a second network policy manager 310e for obtaining the first set of wireless network policies and the second set of wireless network policies, respectively. The first set of wireless network policies is obtained from the first network 101 and the second set of wireless network policies is obtained from the second network 110. In various implementations, the first network policy manager 310d and the second network policy manager 310e provide their respective obtained wireless network policies to a policy aggregator 310f.

The policy aggregator 310f functions to generates a set of aggregated policies by aggregating the first and second sets of wireless network policies based on one or more aggregation criteria 310c-1. The policy aggregator 310f includes an application steering engine 310f-1. In various implementations, the application steering engine 310f-1 generates a set of aggregated application-specific policies based on one or more aggregation criteria 310c-1, as will be described below.

For example, with reference to Tables 1 and 2, below, the application steering engine 310f-1 manages a first set of application-specific wireless network policies (Table 1) and a second set of application-specific wireless network policies (Table 2). In this example, the first set of application-specific wireless network policies is obtained from a first network 101 characterized by a cellular RAT (e.g., 4G/LTE/5G), and include QoS Class Identifier (QCI) based traffic priority levels. In some implementations, the first set of application-specific wireless network policies include QoS parameters defined by slices of a 5G network, such as a particular bandwidth level allocated to IoT devices in the network. The second set of application-specific wireless network policies is obtained from a second network characterized by an IEEE 802-based RAT (e.g., Wi-Fi), and include access-category (AC) based priority levels. One of ordinary skill in the art will appreciate that the first and second networks may each be characterized by any type of RAT and any corresponding traffic priority mechanism, so long as the first and second networks are characterized by different RATs. The application steering engine 310$f$-1 identifies applications that are common to both the first and second sets of application-specific wireless network policies. In this example, as illustrated in Tables 1 and 2, the application steering engine 310$f$-1 identifies that the first and second sets of application-specific wireless network policies share voice, video, and cloud backup application information. One of ordinary skill in the art will appreciate that any variety and number of applications may be shared or not shared between the first and second sets of wireless network policies.

As illustrated in Table 1, the first set of application-specific wireless network policies indicate that traffic associated with the voice application is assigned to a high priority level (QCI level of 2), while traffic associated with the cloud backup is assigned to a low priority level (QCI level of 8). Likewise, as illustrated in Table 2, the second set of application-specific wireless network policies indicate that traffic associated with the voice application is assigned to the highest priority level (access category=voice), while traffic associated with the cloud backup is assigned to the lowest priority level (access category=background).

As further illustrated in Tables 1 and 2, the first and second sets of application-specific wireless network policies include application specifications specifying performance threshold values for proper operation of the applications. For example, Tables 1 and 2 specify performance threshold values including a latency level of no more than 150 ms, a jitter level of no more than 15 ms, and a medium amount of allocated bandwidth, in order for the video application to operate properly.

TABLE 1

First set of application-specific wireless network policies (First Network 101)

| Application | Priority Level (QCI) | Latency Specification | Jitter Specification | Bandwidth Specification |
|---|---|---|---|---|
| Voice | 2 | Latency <= 150 ms | <=15 ms | Low |
| Video | 4 | Latency <= 150 ms | <=15 ms | Medium |
| Cloud Backup | 8 | Latency <= 400 ms | <=100 ms | High |

TABLE 2

Second set of application-specific wireless network policies (Second Network 110)

| Application | Priority Level (AC) | Latency Specification | Jitter Specification | Bandwidth Specification |
|---|---|---|---|---|
| Voice | AC_VO | Latency <= 150 ms | <=15 ms | Low |
| Video | AC_VI | Latency <= 150 ms | <=15 ms | Medium |
| Cloud Backup | AC_BK | Latency <= 400 ms | <=100 ms | High |

The policy aggregator 310$f$ further includes a traffic steering engine 310$f$-2. In various implementations, the traffic steering engine 310$f$-2 generates a set of aggregated channel/network condition information based on the one or more aggregation criteria 310$c$-1, as will be described below.

For example, with reference to Tables 3 and 4, below, the traffic steering engine 310$f$-2 manages a first set of channel/network condition information about the first network 101 (Table 3) and a second set of channel/network condition information about the second network 110 (Table 4). Continuing with the above example, the first set of channel/network condition information is obtained from the first network 101 characterized by a cellular RAT, while the second set of channel/network condition information is obtained from the second network 110 characterized by an 802-based RAT.

As illustrated in Tables 3 and 4, below, the first and second sets of channel/network condition information include congestion information about the first and second networks, respectively. The first and second sets of channel/network condition information also include latency and jitter information about the first wireless channel provided to the client device 130 by the first wireless network and the second wireless channel provided to the client device 130 by the second wireless network, respectively. One of ordinary skill in the art will appreciate that the channel and network conditions about the first and second networks may correspond to any type of condition.

TABLE 3

First set of channel/network condition information (First Network 101)

| Network Congestion level | Channel latency level | Channel jitter level |
|---|---|---|
| Medium | 140 ms | 8 ms |

TABLE 4

Second set of channel/network condition information (Second Network 110)

| Network Congestion level | Channel latency level | Channel jitter level |
|---|---|---|
| High | 120 ms | 14 ms |

As noted above, in various implementations, the application steering engine 310$f$-1 and the traffic steering engine 310$f$-2 generate, on a per-application basis, a set of aggregated policies based on the one or more aggregation criteria 310$c$-1. Table 5, below, includes examples of aggregation criteria applicable to the application steering engine 310$f$-1. Table 6, below, includes examples of aggregation criteria applicable to the traffic steering engine 310$f$-2.

In various implementations, the application steering engine 310*f*-1 generates a set of aggregated application-specific policies by aggregating the first and second sets of application-specific wireless network policies (e.g., Tables 1 and 2), based on applicable aggregation criteria 310*c*-1. With reference to application steering engine 310*f*-1, Table 5, below, includes applicable aggregation criteria corresponding to access level and security level. For example, the client device 130 may not access video (e.g., YOUTUBE) if the client device 130 is connected to a workplace LAN (e.g., the second network 110 is a workplace WLAN). Thus, in some implementations, if the client device 130 is connected to a workplace LAN and attempting to obtain video traffic, rather than aggregating the first and second sets of application-specific wireless network policies related to video traffic, the application steering engine 310*f*-1 provides an indication to the client device 130 that it is not allowed to access video traffic. In this way, the amount of information provided to the client device 130 is reduced. Similarly, if the client device 130 includes outdated antivirus definitions, the application steering engine 310*f*-1 provides an indication to the client device 130 to that effect (e.g., "You may not access VoIP until you get the latest antivirus files"), without sending aggregated policy information to the client device 130. On the other hand, with respect to voice traffic, assuming the client device 130 includes the latest antivirus, the application steering engine 310*f*-1 generates the following aggregated policy, based on Tables 1 and 2, and provides it to the client device 130:

[{Priority level: 2, AC_VO}, {Latency specification: <=150 ms, <=150 ms}, {Jitter Specification: <=15 ms, <=15 ms}, {Bandwidth specification: Low, Low}]

TABLE 5

Aggregation criteria for the application steering engine 310f-1

| Application | Access Level | Security Level |
|---|---|---|
| Voice | Full | Latest antivirus installed |
| Video | None if on workplace LAN | Latest antivirus installed |
| Cloud Backup | Only for network admins | Latest antivirus installed |

One of ordinary skill in the art will appreciate that the aggregation criteria applicable to the application steering engine 310*f*-1 many include any type and number of criteria.

In various implementations, the traffic engine 310*f*-2 generates a set of aggregated channel/network condition policies by aggregating the first and second sets of channel/network condition information (e.g., Tables 3 and 4), based on applicable aggregation criteria 310*c*-1. Table 6, below, includes one or more aggregation criteria applicable to the traffic steering engine 310*f*-2. Satisfaction of any of these aggregation criteria triggers the traffic steering engine 310*f*-2 to generate a set of aggregated channel/network condition policies. For example, with reference to Table 4, if the jitter level associated with the second wireless channel increases from 14 ms to 16 ms, the jitter threshold in Table 6 is satisfied. Accordingly, the traffic steering engine 310*f*-generates, and provides to the client device 130, a set of aggregated channel/network condition policies by aggregating the first and second sets of channel/network condition information. Thus, the traffic steering engine 310*f*-2 generates the following channel/network condition information, based on Tables 3 and 4, and provides it to the client device 130:

[{Network Congestion Level: {Medium, High}, {Channel Latency Level: 140 ms, 120 ms}, {Channel Jitter level: 8 ms, 16 ms}]

TABLE 6

Aggregation criteria for the traffic steering engine 310f-2

| Network congestion threshold | Latency threshold | Jitter threshold |
|---|---|---|
| Medium | Provide if exceeds 150 ms | Provide if exceeds 15 ms |

Figure 4:
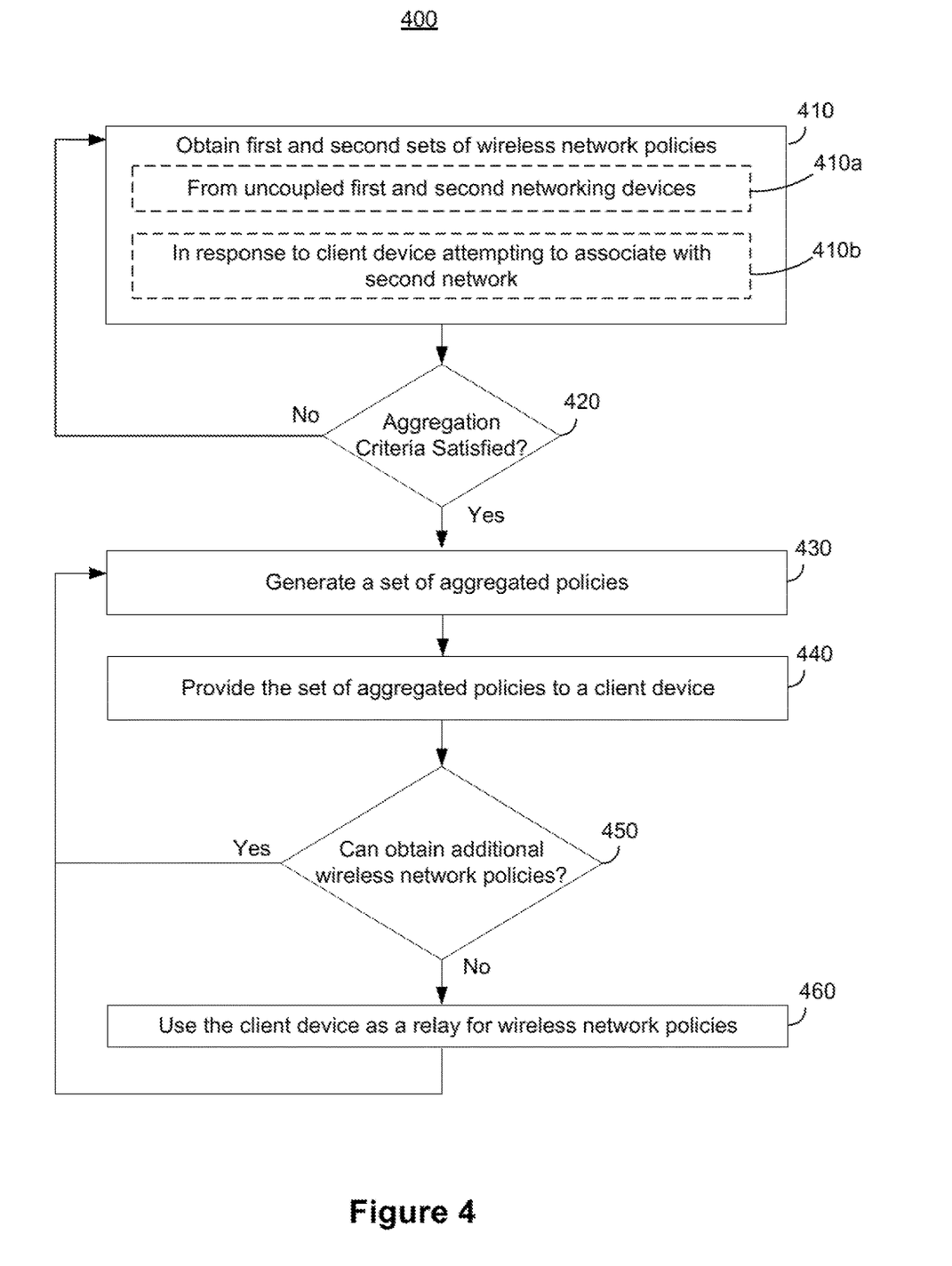
FIG. 4 is a flowchart representation of a method of traffic routing in accordance with some implementations.

FIG. 4 is a flowchart representation of a method 400 of traffic routing in accordance with some implementations. In various implementations, the method 400 is performed by a traffic-steering device, such as the traffic-steering device 121 in FIG. 1, the traffic-steering device 210 in FIG. 2, the traffic-steering device 310 in FIG. 3, or some combination thereof. Briefly, the method 400 includes obtaining two sets of wireless networking policies from two corresponding wireless networks each characterized by a different RAT, generating a set of aggregated policies by aggregating the two sets of wireless networking policies based on one or more aggregation criteria, and providing the set of aggregated policies to a client device in order to direct the client device to steer traffic to the two wireless networks. In various implementations, the first network corresponds to the first network 101 in FIGS. 1-3. In various implementations, the second network corresponds to the second network 110 in FIGS. 1-3. In various implementations, the client device corresponds to the client device 130 in FIGS. 1-3.

To that end, as represented by block 410, the method 400 includes obtaining, from a first wireless network characterized by a first radio access technology (RAT), a first set of wireless network policies. The first set of wireless network policies characterizes a first wireless channel provided to a client device by the first wireless network. As further represented by block 410, the method 400 includes obtaining, from a second wireless network characterized by a second radio access technology (RAT) different from the first RAT, a second set of wireless network policies. The second set of wireless network policies characterizes a second wireless channel provided to the client device by the second wireless network. In some implementations, the first network corresponds to a 3GPP-defined cellular network, such as a 5G network. In some implementations, the second network corresponds to an 802.1x-based network, such as a wireless LAN (WLAN) (e.g., Wi-Fi, Wi-Max).

As represented by block 410*a*, in some implementations, the first set of wireless network policies is obtained from a first networking device, the second set of wireless network policies is obtained from a second networking device, and the first networking device and the second networking device are not in communication with each other. For example, with reference to FIG. 1, the first networking device 102 is not in communication with the second networking device 111. As another example, with reference to FIG. 2, the first networking device 102 is not in communication with the second networking device 220.

As represented by block 410*b*, in some implementations, the second set of wireless network policies is obtained in response to receiving, from the client device, a request to establish a connection with the second wireless network. For example, with reference to FIG. 2, in response to the client device attempting to associate with the second network 110, the file sharing server 230 (e.g., a Local NAS) sends an authentication request associated with the client device and a request to an authentication server (e.g., a RADIUS server) for the second set of wireless network policies. In some implementations, the authentication server resides at the second networking device 220. The authentication server, in response, provides authentication verification and the second set of wireless network policies. In some implementations, while the authentication process is happening, the traffic-steering device 210 obtains the first set of wireless network policies from the first network 101.

As represented by block 420, in some implementations, the method 400 includes determining whether the first and second sets of wireless network policies satisfy one or more aggregation criteria. In some implementations, the one or more aggregation criteria include application-specific criteria, such as access levels on a per application basis. For example, a company's WLAN may specify that gaming applications are not allowed. In some implementations, the one or more aggregation criteria include network or channel threshold values. In some implementations, the one or more aggregation criteria include channel or network related criteria.

As represented by block 430, if either or both of the first and second sets of wireless network polices satisfy the one more aggregation criteria, the traffic-steering device generates a set of aggregated policies by aggregating the first set of wireless network policies and the second set of wireless network policies. For example, with reference to Tables 6, if the channel jitter of one or both of the first or second wireless channels exceeds 15 ms, the traffic-steering device generates a set of aggregated policies including that information, as well as other network/channel information, and, in some implementations, including application-specific policies as well. As another example, in some implementations, the traffic-steering device continuously sends the aggregated network/channel policies, whether or not the corresponding criteria are satisfied. In this case, the client device continuously receives the latest information, but at the cost of additional traffic sent to the client device. If, on the other hand, neither the first set of wireless network polices nor the second set of wireless network polices satisfies the one more aggregation criteria, the method 400 includes reverting back to the portion of the method 400 indicated by block 410 in order to obtain updated or revised first and second wireless network policies.

As represented by block 440, the set of aggregated policies are provided to the client device. The set of aggregated policies directs the client device to steer traffic to the first and second wireless networks.

As represented by block 450, in some implementations, the method 400 includes obtaining additional wireless network policies from the first and/or second network. In some implementations, the network policies are obtained periodically or nearly-periodically (e.g., every second). In some implementations, the network policies are obtained in response to satisfaction of a threshold, such as a sufficient number of other client devices leaving or joining the first or second network.

As represented by block 460, in the event that additional wireless network policies cannot be obtained, the method 400 includes utilizing the client device may be used a relay for the policies. For example, with reference to FIG. 1, if the link between the traffic-steering device 121 and the first network 101 goes down, the traffic-steering device 121 queries the client device 130 to obtain the wireless network policies from the first network 101 and relay them to the traffic-steering device 121. The same procedure may be performed if the link between the between the traffic-steering device 121 and the second network 110 goes down. As another example, the second network 101 corresponds to a private WLANs that is completely inaccessible to the traffic-steering device 121. Nevertheless, the traffic-steering device 121 may query a client device connected to the private WLAN, via an 802.11u frame, for example, to obtain the second set of wireless network policies from the private WLAN and relay them to the traffic-steering device 121. As further represented by block 460, in the event that additional wireless network policies can be obtained, the method 400 includes generating a new set of aggregated policies.

Figure 5:
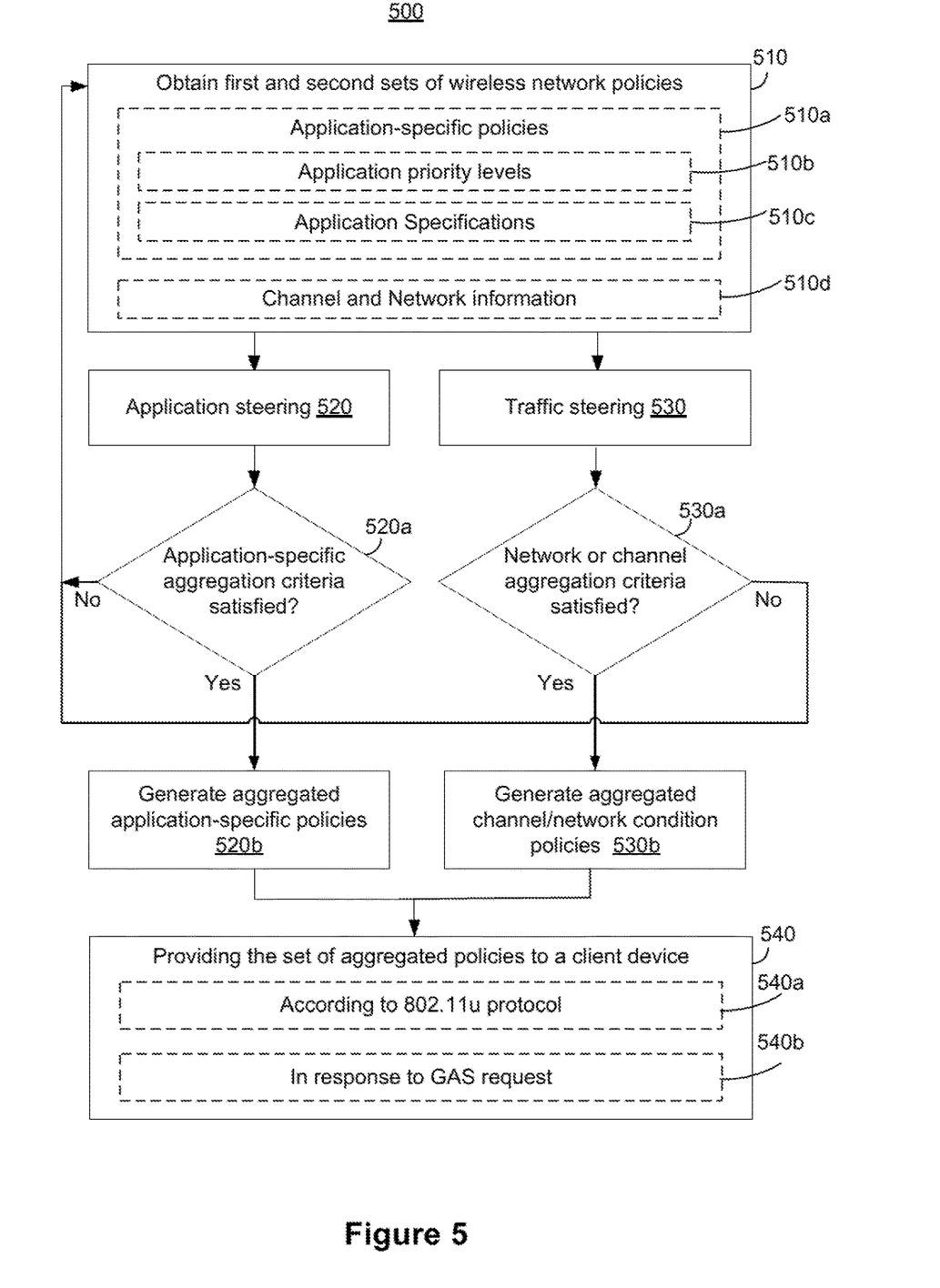
FIG. 5 is a flowchart representation of a method of traffic routing in accordance with some implementations.

FIG. 5 is a flowchart representation of a method 500 of traffic routing in accordance with some implementations. In various implementations, the method 500 is performed by a traffic-steering device, such as the traffic-steering device 121 in FIG. 1, the traffic-steering device 210 in FIG. 2, the traffic-steering device 310 in FIG. 3, or some combination thereof. Briefly, the method 500 includes obtaining two sets of wireless networking policies from two corresponding wireless networks each characterized by a different RAT, generating a set of aggregated policies by aggregating the two sets of wireless networking policies based on one or more aggregation criteria, and providing the set of aggregated policies to a client device in order to direct the client device to steer traffic to the two wireless networks. In various implementations, the first network corresponds to the first network 101 in FIGS. 1-3. In various implementations, the second network corresponds to the second network 110 in FIGS. 1-3. In various implementations, the client device corresponds to the client device 130 in FIGS. 1-3.

As represented by block 510, the method 500 includes obtaining, from a first and second network characterized by different RAT, first and second sets of wireless network policies, respectively. As represented by block 510a, in various implementations, the wireless network policies include application-specific criteria. For example, as represented by block 510b, in various implementations, the application-specific criteria include priority levels corresponding to traffic associated with different applications, such as QoS parameters (e.g., parameters associated with QCI, SLA, class of service, access categories, differentiated services code point (DSCP), etc.). As another example, as represented by block 510c, in various implementations, the application-specific criteria include application specifications for proper application operation, such as a low latency specification for a video application (e.g., CISCO WEBEX) or a high bandwidth for a cloud backup application.

As represented by block 510d, in various implementations, the wireless network policies include channel and/or network information. For example, the wireless network policies indicate a 5 ms jitter level for the first channel and a 7 ms jitter level for the second channel. As another example, the wireless network policies indicate that the first network is overloaded with requests, while the second network has plenty of resources to service new requests.

From block 510d, in various implementations, the method 500 continues to one or both of application steering block 520 and traffic steering block 530. In some implementations, the method 500 concurrently (or near concurrently) executes the application steering block 520 and traffic steering block 530. In some implementations, the method 500 sequentially executes the application steering block 520 and traffic steering block 530.

With respect to application steering, as represented by block 520a, in various implementations, the method 500 includes determining whether one or more application-specific aggregation criteria are satisfied. For example, an application-specific aggregation criterion is satisfied if the class of traffic being requested by the client device is accessible by the client device—e.g., no watching videos on work WLAN.

If the one or more application-specific aggregation criteria are satisfied, in some implementations, the method 500 includes generating aggregated application-specific policies, as represented by block 520b. If the one or more application-specific aggregation criteria are not satisfied, in some implementations, the method 500 includes reverting back to block 510 and obtaining additional wireless network policies.

With respect to traffic steering, as represented by block 530a, in various implementations, the method 500 includes determining whether one or more network or channel aggregation criteria are satisfied. For example, in some implementations, if a wireless network policy indicates a high level of congestion, a corresponding aggregation criterion is deemed to be satisfied. Accordingly, as represented by block 5330b, in some implementations, the method 500 includes generating aggregated network condition policies. If the one or more network or channel aggregation criteria are not satisfied, in some implementations, the method 500 includes reverting back to block 510 and obtaining additional wireless network policies.

As represented by block 540, the method 500 includes providing the set of aggregated policies to a client device. As represented by block 540a, in various implementations, the method 500 includes providing the set of aggregated policies to the client device according to the 802.11u protocol. For example, in some implementations, the set of aggregated policies is set within a generic advertisement service (GAS) frame, which is an IEEE 802.11u service. As represented by block 540b, in various implementations, the method 500 includes providing the set of aggregated policies, via a GAS vendor specific information element (IE), in response to obtaining, from the client device, a GAS request for the set of aggregated policies.

Figure 6:
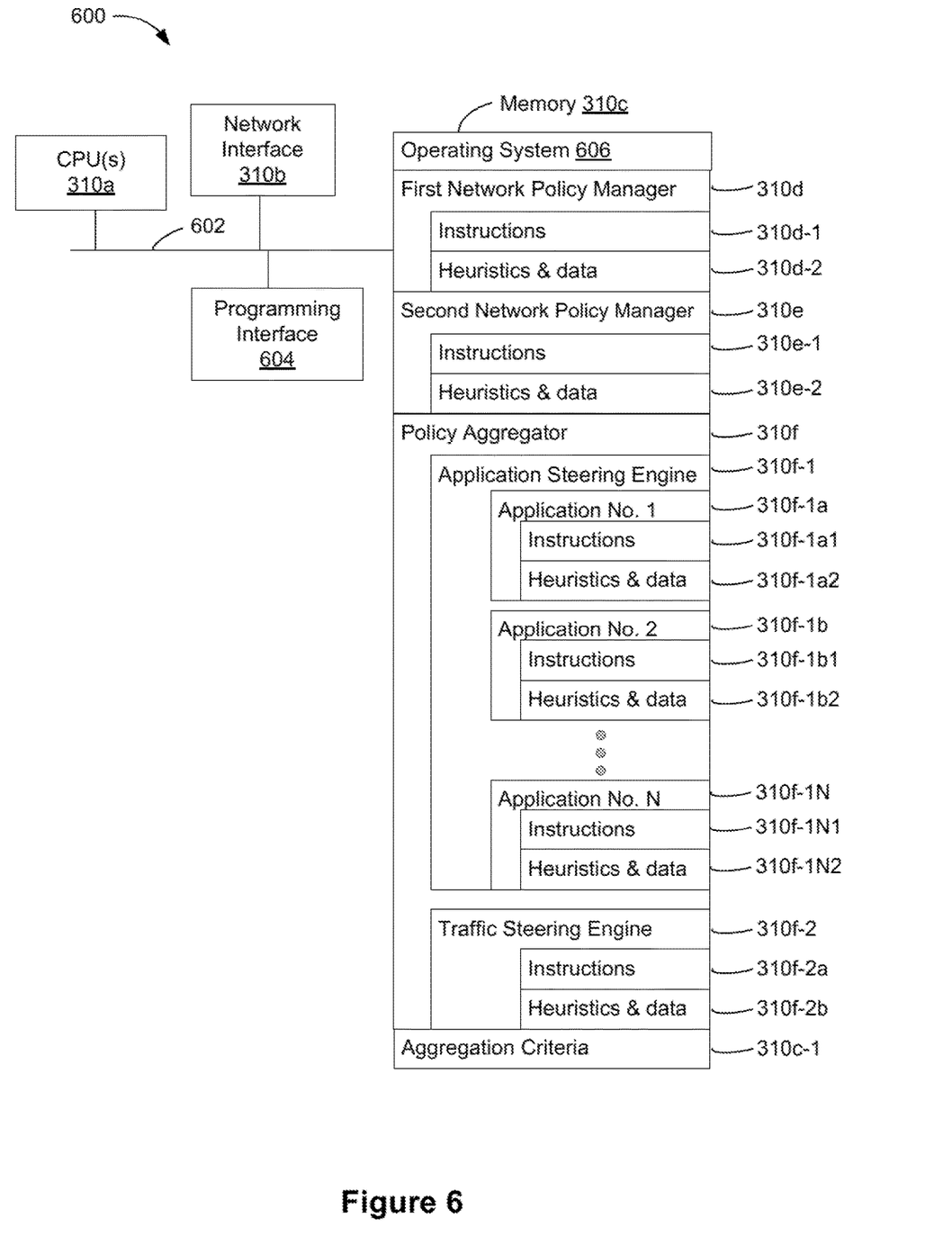
FIG. 6 is a block diagram of a traffic-steering device in accordance with some implementations.

FIG. 6 is a block diagram of a traffic-steering device 600 in accordance with some implementations. In some implementations, the traffic-steering device 600 is similar to and adapted from the traffic-steering device 121 in FIG. 1. In some implementations, the traffic-steering device 600 is similar to and adapted from the traffic-steering device 210 in FIG. 2. In some implementations, the traffic-steering device 600 is similar to and adapted from the traffic-steering device 310 in FIG. 3. While certain specific features are illustrated, those skilled in the art will appreciate from the present disclosure that various other features have not been illustrated for the sake of brevity, and so as not to obscure more pertinent aspects of the implementations disclosed herein.

To that end, as a non-limiting example, in some implementations the traffic-steering device 600 includes one or more processing units (CPU's) 310a, a network interface 310b, a memory 401b, a programming (I/O) interface 604, and one or more communication buses 602 for interconnecting these and various other components.

In some implementations, the one or more communication buses 602 include circuitry that interconnects and controls communications between system components. The memory 310c includes high-speed random-access memory, such as DRAM, SRAM, DDR RAM or other random-access solid-state memory devices; and may include non-volatile memory, such as one or more magnetic disk storage devices, optical disk storage devices, flash memory devices, or other non-volatile solid-state storage devices. The memory 310c optionally includes one or more storage devices remotely located from the CPU(s) 310a. The memory 310c includes a non-transitory computer readable storage medium. In some implementations, the memory 310c or the non-transitory computer readable storage medium of the memory 310c stores the following programs, modules and data structures, or a subset thereof including an optional operating system 606, a first network policy manager 310d, a second network policy manager 310e, a policy aggregator 310f, and one or more aggregation criteria 310c-1.

The operating system 606 includes procedures for handling various basic system services and for performing hardware dependent tasks.

In some implementations, the first network policy manager 310d is configured to obtain a first set of wireless network policies from a first network characterized by a first RAT. To that end, in various implementations, the first network policy manager 310d includes instructions and/or logic 310d-1 and heuristics and metadata 310d-2.

In some implementations, the second network policy manager 310e is configured to obtain a second set of wireless network policies from a second network characterized by a second RAT different from the first RAT. To that end, in various implementations, the second network policy manager 310e includes instructions and/or logic 310e-1 and heuristics and metadata 310e-2.

In some implementations, the policy aggregator 310f is configured to generate a set of aggregated policies by aggregating the first and second sets of wireless network policies based on one or more aggregation criteria 310c-1. To that end, in various implementations, the policy aggregator 310f includes an application steering engine 310f-1 and a traffic steering engine 310f-2.

In some implementations, the application steering engine 310f-1 is configured to generate a set of aggregated application-specific policies based on one or more aggregation criteria 310c-1. To that end, in some implementations, the application steering engine 310f-1 includes a number of application modules 301f-1a-301f-1N. Each of the application modules 301f-1a-301f-1N includes respective instructions and/or logic and heuristics and metadata.

In some implementations, the traffic steering engine 310f-2 is configured to generate a set of aggregated channel/network condition information based on the one or more aggregation criteria 310c-1. To that end, in various implementations, the traffic steering engine 310f-2 includes instructions and/or logic 310f-2a and heuristics and metadata 310f-2b.

Moreover, FIG. 6 is intended more as functional description of the various features which may be present in a particular embodiment as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one embodiment to another, and may depend in part on the particular combination of hardware, software, and/or firmware chosen for a particular embodiment.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first network could be termed a second network, and, similarly, a second network could be termed a first network, which changing the meaning of the description, so long as all occurrences of the "first network" are renamed consistently and all occurrences of the "second network" are renamed consistently. The first network and the second network are both networks, but they are not the same networks.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a traffic-steering device including one or more processors and a non-transitory memory:
   obtaining, from a first wireless network characterized by a first radio access technology (RAT), a first set of wireless network policies, wherein the first set of wireless network policies characterizes a first wireless channel provided to a client device by the first wireless network;
   obtaining, from a second wireless network characterized by a second RAT different from the first RAT, a second set of wireless network policies, wherein the second set of wireless network policies characterizes a second wireless channel provided to the client device by the second wireless network, the obtaining comprising:
   determining an inability to obtain at least one wireless network policy, of the second set of wireless network policies, from a network device associated with the second wireless channel, and in response:
   querying the client device for the at least one wireless network policy; and
   receiving, over the first wireless channel from the client device, the at least one wireless network policy;
   generating a set of aggregated policies by aggregating the first set of wireless network policies relating to the first RAT and the second set of wireless network policies relating to the second RAT, based on one or more aggregation criteria, the aggregating comprising:
   identifying a first policy in the first set of wireless network policies;
   identifying a second policy in the second set of wireless network policies; and
   generating a third policy based on the first policy, the second policy, and the one or more aggregation criteria, wherein the set of aggregated policies comprises the third policy in place of the first policy and the second policy; and
   providing, to the client device, the set of aggregated policies, wherein the set of aggregated policies directs the client device in steering traffic to the first and second wireless networks.

2. The method of claim 1, wherein the set of aggregated policies are provided to the client device according to 802.11u protocol.

3. The method of claim 2, wherein the traffic-steering device provides the set of aggregated policies, via a generic advertisement service (GAS) vendor specific information element, in response to obtaining, from the client device, a GAS request for the set of aggregated policies.

4. The method of claim 1, wherein the second set of wireless network policies is obtained in response to receiving, from the client device, a request to establish a connection with the second wireless network.

5. The method of claim 1, wherein at least one of the first set of wireless network policies or the second set of wireless network policies include corresponding first condition-information about the first wireless channel and second condition-information about the second wireless channel.

6. The method of claim 1, wherein at least one of the first set of wireless network policies or the second set of wireless network policies include corresponding first condition-information about the first wireless network and second condition-information about the second wireless network.

7. The method of claim 1, wherein the first set of wireless network policies includes a first application-specific policy associated with a particular application, and the second set of wireless network policies includes a second application-specific policy associated with the particular application.

8. The method of claim 7, wherein each of the first application-specific policy and the second application-specific policy includes corresponding specifications associated with the particular application.

9. The method of claim 7, wherein each of the first application-specific policy and the second application-specific policy includes a corresponding priority level associated with the particular application.

10. The method of claim 1, wherein the first set of wireless network policies is obtained from a first networking device, wherein the second set of wireless network policies is obtained from a second networking device, and wherein the first networking device and the second networking device are not in communication with each other.

11. A traffic-steering device, comprising:
a first network policy manager to obtain, from a first wireless network characterized by a first radio access technology (RAT), a first set of wireless network policies, wherein the first set of wireless network policies characterizes a first wireless channel provided to a client device by the first wireless network;
a second network policy manager to obtain, from a second wireless network characterized by a second RAT different from the first RAT, a second set of wireless network policies, wherein the second set of wireless network policies characterizes a second wireless channel provided to the client device by the second wireless network; and
a policy aggregator to generate a set of aggregated policies by aggregating the first set of wireless network policies relating to the first RAT and the second set of wireless network policies relating to the second RAT, based on one or more aggregation criteria, the aggregating comprising:
identifying a first policy in the first set of wireless network policies;
identifying a second policy in the second set of wireless network policies; and
generating a third policy based on the first policy, the second policy, and the one or more aggregation criteria, wherein the set of aggregated policies comprises the third policy in place of the first policy and the second policy;
wherein the traffic-steering device provides, to the client device, the set of aggregated policies, wherein the set of aggregated policies directs the client device to steer traffic to the first and second wireless networks.

12. The traffic-steering device of claim 11, the second network policy manager to obtain the second set of wireless network policies in response to receiving, from the client device, a request to establish a connection with the second wireless network.

13. The traffic-steering device of claim 11, wherein at least one of the first set of wireless network policies or the second set of wireless network policies include at least one of:
corresponding first channel condition-information about the first wireless channel and second channel condition-information about the second wireless channel; or
corresponding first network condition-information about the first wireless network and second network condition-information about the second wireless network.

14. The traffic-steering device of claim 11, wherein the first set of wireless network policies includes a first application-specific policy associated with a particular application, and the second set of wireless network policies includes a second application-specific policy associated with the particular application.

15. The traffic-steering device of claim 14, wherein each of the first application-specific policy and the second application-specific policy includes corresponding specifications associated with the particular application.

16. The traffic-steering device of claim 14, wherein each of the first application-specific policy and the second application-specific policy includes a corresponding priority level associated with the particular application.

17. The traffic-steering device of claim 11, wherein the one or more aggregation criteria include one or more of an access level, security level, network condition threshold, or channel condition threshold.

18. The traffic-steering device of claim 11, further comprising, a network interface;
wherein in response to determining an inability to obtain additional wireless network policies from a particular networking device of a first networking device or a second networking device, wherein the particular networking device is associated with a particular wireless channel and the other networking device of the first networking device or the second networking device is associated with the other wireless channel:
the network interface to query the client device for the additional wireless network policies associated with the particular networking device; and
the network interface to receive, over the other wireless channel, the additional network policies from the client device in response to querying the client device.

19. A non-transitory computer readable medium storing one or more programs, the one or more programs including instructions, which, when executed by one or more processors of a traffic-steering device, cause the traffic-steering device to:
obtain, from a first wireless network characterized by a first radio access technology (RAT), a first set of wireless network policies, wherein the first set of wireless network policies characterizes a first wireless channel provided to a client device by the first wireless network;
obtain, from a second wireless network characterized by a second RAT different from the first RAT, a second set of wireless network policies, wherein the second set of wireless network policies characterizes a second wireless channel provided to the client device by the second wireless network, the obtaining comprising:
determining an inability to obtain at least one wireless network policy, of the second set of wireless network policies, from a network device associated with the second wireless channel, and in response:
querying the client device for the at least one wireless network policy; and
receiving, over the first wireless channel from the client device, the at least one wireless network policy;
generate a set of aggregated policies by aggregating the first set of wireless network policies and the second set of wireless network policies based on one or more aggregation criteria; and
provide, to the client device, the set of aggregated policies, wherein the set of aggregated policies directs the client device to steer traffic to the first and second wireless networks.

20. The method of claim 1, wherein the one or more aggregation criteria comprise at least one of a user class criteria or a security criteria.

* * * * *